United States Patent [19]
Power et al.

[11] 3,760,666
[45] Sept. 25, 1973

[54] APPARATUS FOR SCARIFYING PULSES SUCH AS FRESH PEAS

[76] Inventors: Eamonn Power, c/o Erin Foods Ltd., Thurles; Padraic O'Brolchain, c/o Research and Development Comhlucht Siuicre Eireann, Teo., Carlow, both of Ireland

[22] Filed: Dec. 21, 1971

[21] Appl. No.: 210,478

[30] Foreign Application Priority Data
Dec. 23, 1970 Ireland.............................. 1633/70

[52] U.S. Cl............................ 83/11, 83/12, 99/485, 83/2
[51] Int. Cl. ....................... B26d 3/08, A23n 15/02
[58] Field of Search...................... 83/2, 425.3, 157, 83/165, 30, 660; 99/485; 241/277, 186.2

[56] References Cited
UNITED STATES PATENTS
3,196,913 7/1965 Stahmer............................. 83/30 X
2,858,082 10/1958 Berling........................ 241/186.2 X
332,854 12/1885 Woods.............................. 241/277

Primary Examiner—Willie G. Abercrombie
Attorney—Irvin S. Thompson et al.

[57] ABSTRACT

A machine for puncturing the skins of small pulses, particularly fresh peas which are to be air or freeze dried. The machine has a series of co-axial circular knife blades which are revolved at high speed while the peas are dropped through a gravity feed chute onto the edges of the blades, from which they rebound with their skins nicked by the blades. The feed chute is angularly adjustable relative to the blades to allow for variations in the size and quality of the peas or other pulses requiring slitting.

5 Claims, 3 Drawing Figures

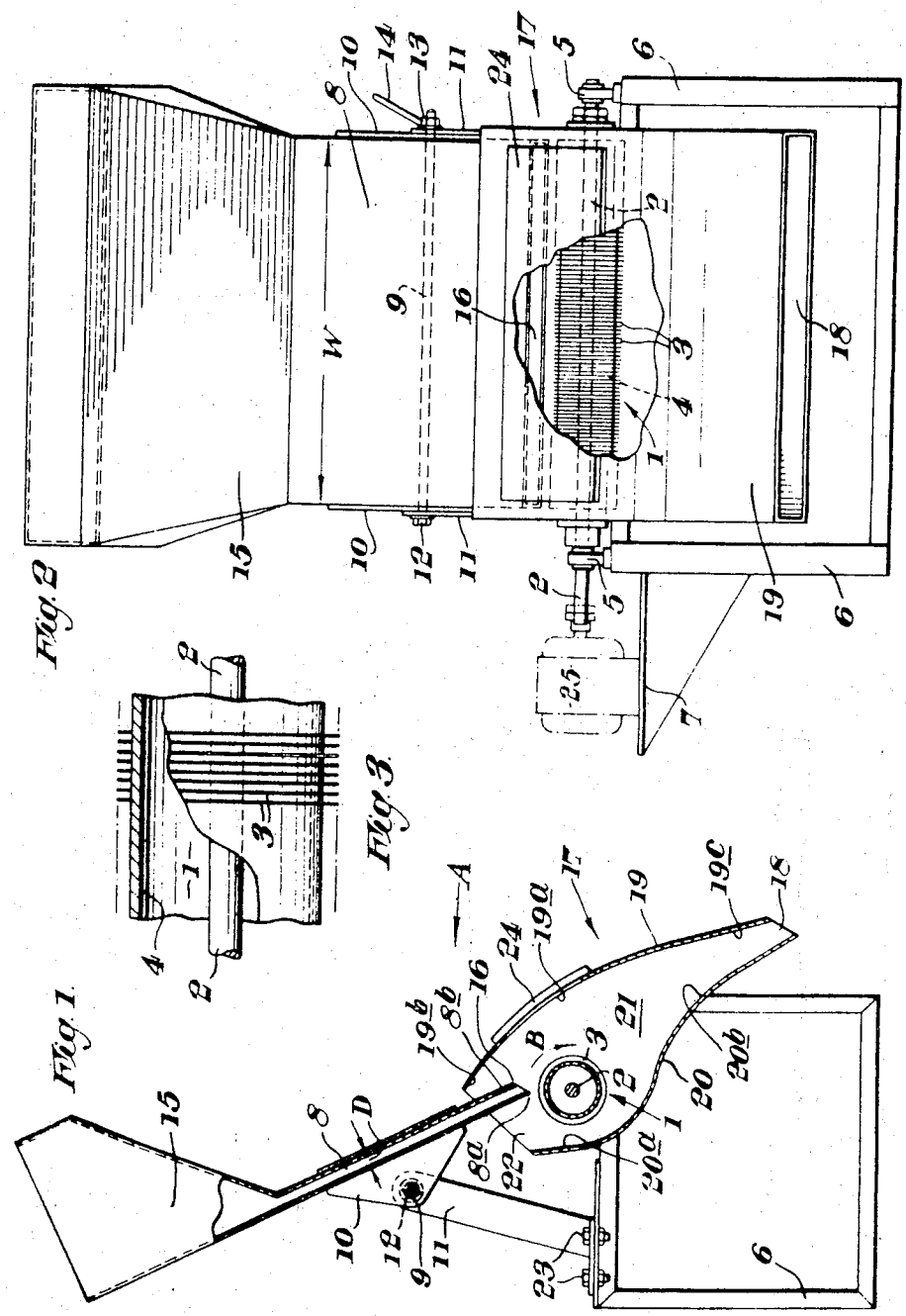

APPARATUS FOR SCARIFYING PULSES SUCH AS FRESH PEAS

BACKGROUND OF INVENTION

It is well known to preserve peas or other pulses (hereinafter generally referred to as "peas") by subjecting fresh peas, that is peas in the green state as and when newly picked, to drying, e.g. hot air drying or freeze drying. The dried peas can be prepared as required for human consumption by soaking in water and subsequently cooking in water or steam, during which treatment the dried peas absorb water, swelling to near their original size if shrinkage has occurred during drying and regaining the appearance of cooked fresh (non-dried) peas. The restoration of appearance and size by water absorption is termed "reconstitution".

It has been established that, as compared with peas having unpunctured skins, reconstituted peas are markedly improved if the skins of the dried peas have been punctured. For this purpose it has been proposed to provide apparatus comprising a series of circular knife blades which are spaced apart upon a common axle a distance somewhat less than the anticipated diameter of the peas to be treated, the blades being revolved at high speed while the peas to be punctured are dropped as a stream upon the edges of the blades, from which they rebound with their skins nicked by the blades.

It has been found, however, extremely difficult to obtain entirely satisfactory results with such apparatus as hitherto proposed, because the condition of the peas under treatment may vary, as well as the size of the peas being treated at any particular time; sometimes the apparatus produces very satisfactory results, while at other times the peas are unduly damaged in puncturing the skin, or again they may not be properly punctured.

SUMMARY OF THE INVENTION

The object of this invention is to provide apparatus for making small slits in the skins of fresh pulses, e.g. peas, before they are dried, without so damaging the skins that they may become detached at any time before or during reconstitution, and moreover to enable successful treatment of the pulses to be achieved in spite of variations in the condition or size of the pulses to be treated from time to time.

The invention accordingly provides apparatus comprising a slitting unit which is a cylindrical array of axially spaced annular blades mounted with its axis horizontal and rotatable about that axis and a gravity feed chute extending downwardly towards the unit, characterised by the fact that the chute is angularly adjustable in position relatively to the blade unit so that the angle at which the pulses falling in a stream from the chute strike the peripheral cutting edges of the blades is adjustable. For this purpose the chute is advantageously mounted so as to be adjustable about an axis parallel to the axis of rotation of the blade unit.

IN THE DRAWINGS

FIG. 1 is a side elevation partly in section;

FIG. 2 is a front elevation, also partly in section, of the apparatus as seen in the direction of the arrow A in FIG. 1; and FIG. 3 is an enlarged view, partly in section of a fragment of the slitting unit.

DESCRIPTION OF THE PREFERRED EMBODIMENT

The slitting unit 1 comprises a shaft 2 having fast thereon and co-axial therewith a larger diameter hollow shaft 4 fitted with a number of axially spaced equal diameter disc-like blades 3 with very sharp peripheral cutting edges. The blades 3 are evenly spaced by intermediate spacer discs of smaller diameter than the blades 3. The spacer discs are omitted for clarity from the drawings. The shaft 2 is rotatable in end bearings 5,5 on a main supporting frame 6, with its axis horizontal. Any convenient means will serve to drive the shaft such as an electric motor (shown in outline at 25 in FIG. 2) which may be coupled to the shaft directly or through gearing, for instance meshing toothed gears, sprocket-and-chain or pulley-and-belt. The speed of the drive will be determined by, for instance, the nature of the pulses to be treated, but usually for treating peas the peripheral speed of the blades 3 would not be less than 15 feet per second (approximately 5 metres per second) and not more than 70 feet per second (approximately 23 metres per second). The gap between the peripheral cutting edges of adjacent blades 3 would not be greater than the smallest diameter of pulses to be treated; for treating fresh peas the gap will not usually be less than three thirty-seconds inch (2.7 mm) nor greater than one-half inch (12.2 mm).

In the arrangement shown, the appropriate shaft driving means would be coupled to the overhanging shaft-end at the left hand side in FIG. 2, the motor or other driving unit being supported on a side bracket 7.

A feed chute 8, which opens from the bottom or a hopper 15, is internally of rectangular cross-section with the larger dimension of its section, i.e., its width W (FIG. 2), not greater than the total width of the array of blades 3, and smaller dimension, i.e., the depth D (FIG. 1), not less than will allow the largest diameter pulse to fall freely through the chute 8. The depth D (FIG. 1), for example, may be three times the average diameter of the peas under treatment. The diameter of the blades 3 is preferably not less than three times the depth of the rectangular section of the chute. The chute 8 is hingedly supported, on a horizontal bar 9 above the slitting unit 1 so that the chute can be angularly adjusted about the axis of the bar 9 which is parallel to the axis of the unit 1, with the width W of the chute being parallel to those axes.

The chute 8 is fastened to and between two bracket plates 10,10. A sub-frame comprises two spaced parallel support bars 11,11 bolted at their lower ends to, and extending upwardly and slightly forwardly inclined from, the top of the main frame 6. The bar 9 is the stem of a long bolt extending through aligned holes in the bracket plates 10,10 and the upper ends of the support bars 11,11 which are outside the bracket plates 10,10, the head 12 of the bolt being outside one support bar 11 and the nut 13 engaging the other end of the bolt outside the other support bar 11. The nut 13 is conveniently formed as part of a handle 14. By releasing the nut 13, by means of the handle 14, the chute can be adjusted on the bar 9 to the required inclination and thereafter secured in that condition by re-tightening the nut 13, the chute 8 being preferably clamped frictionally by the introduction of friction pads inserted between the bracket plates 10,10 and support bars 11,11.

The length of the chute 8, the dimensions of the subframe 11,11 and the bracket plates 10,10, and the position of the axis of the bar 9 are so selected that the chute 8 can be inclined at a required angle to the vertical with its lower end 16 forwardly (i.e., to the right of FIG. 1) in the direction of rotation of the slitting unit 1 (arrow B) and spaced a predetermined distance from the periphery of the blades 3. The mouth at the lower end 16 of the chute 8 is set at an appropriate angle to the longitudinal direction of the chute, as indicated in FIG. 1, so that the rear wall 8a of the chute extends further than its front wall 8b towards the slitting unit 1. Also the chute is so set that its axial plane, that is its mid-plane between and parallel to the front and rear walls, 8a, 8b, if extended, would meet the array of blades 3 forwardly of the top of the array and is parallel to a plane which is tangential to the blades at a position in front of the intersection of that mid-plane with the peripheries of the blades.

The arrangement is such that when the slitting unit 1 is rotated in the direction of the arrow B in FIG. 1 and non-dried peas are fed through the chute 8 by gravity, the skins of the peas will be slit without being cut to such an extent as to become detached during the slitting operation or during any subsequent operation, including their eventual reconstitution. The peas are thrown forward and clear of the blades 3, by the rotary movement of the slitting unit, to engage the wall of an outlet guide chute 17 by which they are directed through a lower discharge opening 18 to any suitable receiver ready for the next treatment stage.

The form of the guide chute 17 is such that it will not direct the peas back to the slitting unit 1.

The main chamber of the guide chute 17 is a front plate 19, extending across something more than the full width of the array of blades 3, and more than the full width of the lower end 16 of the main chute 8, in front of and spaced from the array of blades 3 and set, in general, at an angle to the vertical which is somewhat greater than the angle of inclination of the main chute 8. Thereby, peas thrown forwardly by the slitting unit 1 against the plate 19 will be deflected in a downwardly direction away from the slitting unit 1. As indicated in FIG. 1, the plate 19 is approximately arcuate, with its concave side 19a facing the slitting unit 1, with a radius of curvature considerably greater than the radius of the peripheries of the blades and about an axis parallel to the axis of the slitting unit 1. The upper end 19b extends to overlap the lower end 16 of the main chute 8. The lower end 19c extends downwardly and forwardly as a planar extension of the main arcuate deflecting portion 19a.

The outlet guide chute 17 is of open ended box form of which the plate 19 is the front, the back 20 of the box having an upper curved portion 20a which extends about, and is well spaced from, the blades 3, and a lower reverse curved portion 20b which converges towards the lower part 19c of the front plate 19 to form the rear part of the discharge opening 18. The sides of the box 21, of which one is seen in FIG. 1, are flat parallel members, extending between the front and back plates 19,20 and apertured for the ends of the slitting unit 1 to extend therethrough. The lower end 16 of the main chute 8 extends freely into the opening 22 at the top of the box-form chute 17. This box-form chute 17 may be pivotally adjustable about the axis of the slitting unit 1 or about an axis which is parallel thereto.

The main chute 8 may also be adjustable additionally to being pivotal about the bar 9. For instance, the subframe 11,11 may be made horizontally adjustable towards and away from the slitting unit, by providing for the bolts 23 to engage in slots in the main support frame 6 and/or sub-frame 11,11. Alternatively or additionally, the main chute 8 may be longitudinally adjustable on the bracket plates 10,10 to adjust the height of the hopper 15 at the upper end of the chute 8. In the latter case the chute 8 would preferably be telescopic to enable the height of its lower end 16 above the slitting unit to be adjusted independently of the height of the hopper 15 and/or to compensate for a change of the height of the lower end of the chute 16 when the angle of inclination of the chute 8 is altered. The chute 8 may, when telescopic, comprise two telescoping parts attached to the bracket plates 10,10 and/or to one another by thumb screws or other releasable clamping means to facilitate the length adjustment and/or removal of the chute from the bracket plates.

The front plate 19 of the discharge chute 17 is conveniently provided with a removable cover plate 24 to provide access to the slitting blades 3.

When the main chute 8 comprises two telescopically associated parts, it is preferable for the upper part to engage inside the lower part; the opposite arrangement may present an internal annular ledge which might affect the free flow of pulses.

Peas may be fed gravitationally through the main chute 8 from a hopper 15 as illustrated or from a conveyor or from some other convenient primary feeding or supplying device. When the apparatus is adjusted to the most effective conditions, the peas falling from the main chute 8 in the required direction are caused to hit the blades 3 while moving in a direction which has a component in the sense of the direction of movement of the blades 3 at the positions of impact. The skins of the peas are cut, in the sense of being slit or scarified, when they strike the blades 3, and the peas are then thrown clear and into engagement with the front plate 19 of the outlet guide chute 17. Due to the particular form of the front plate 19 and its relation to the slitting unit 1, the peas cannot be bounced or otherwise thrown back against the blades 3, thus ensuring that the skins are slit only to the controlled extent determined by the conditions under which the peas first meet the blades 3.

Due to the particular shape of the arcuate part 19a of the front plate 9 of the outlet guide chute 17, having a radius of curvature greater than the external radius of the cutter blades 3 and on a centre which is further from the arcuate part 19a than the axis of the slitting unit 1, the front plate 19 diverges from the peripheries of the blades both upwardly and downwardly from the position in which the front plate 19 is nearest to the blades 3, the space between the plate 19 and the blades 3 at the nearest position being made sufficient to ensure that peas cannot be pressed by the front plate 19 against the blades 3.

The essential part of the outlet guide chute 17 which determines that the peas will not be caused to rebound on to the blades 3, nor be pressed against them by the chute, is the front plate 19. The incorporation of the front plate in an open-ended box-form of the kind hereinbefore described is a convenient adaptation to provide additionally a directional discharging means leading to a receiver of a form determined by the nature of the next operation to be performed on the slit peas.

The primary advantage of the improved apparatus is that peas and other pulses can be effectively slit without being over-scarified. When the apparatus has been adjusted to operate in an acceptably effective manner on a particular pulse form, e.g. peas, it will handle all sizes within its maximum range without it being necessary to alter the setting, so that a separate previous size grading step is not required. For instance, with blades of 4-inches (10 cms) diameter rotating at 1,450 rpm, fresh peas are satisfactorily treated when the top of the feed chute 8 is about 30-inches (75 cms) above the axis of the blades 3 and the chute 8 inclined at 70° to the horizontal, the peas being directed to a region which is about 30° forwardly of the tops of the blades.

The apparatus is less expensive than previously proposed pulse scarifying machines and maintenance costs are also less because, since the peas or other pulses and any occasional stones or stems are not pressed against the blades, wear of the blades is reduced. Also the total number of components of the apparatus is minimal. As previously mentioned, peas do not need to be size-graded before being fed to the apparatus.

What we claim is:

1. Apparatus for scarifying pulses comprising a cylindrical array of annular blades rotatably mounted on a horizontal axis, means for rotating said blades at high speed, a pulse container disposed above said blades, a gravity chute extending downward from the pulse container and terminating above said blades, the discharge end of the chute being spaced from the blades but being arranged relative to the blades such that the extended axial plane of the chute meets the array of blades forwardly of the top of the array of blades that is in the direction of rotation, and is parallel to a plane which is tangential to the blades at a position forwardly of the intersection of the said axial plane with the peripheries of the blade, means for pivotally adjusting said chute about an axis parallel to the axis of the blades, and a deflector plate spaced from the periphery of the blades and inclined downward from above the delivery end of the chute to below the cylindrical array of blades and on the side of the blades adjacent to the downwardly moving part of the blade peripheries during their rotation.

2. Apparatus for scarifying pulses as claimed in claim 1, wherein the deflector plate is curved and is concave and opens toward the blades with a radius of curvature greater than that of the periphery of the blades and about an axis parallel to that of the blades located further from the deflector plate than the axis of the blades.

3. Apparatus for scarifying pulses as claimed in claim 1, wherein the gravity chute is telescopic.

4. Apparatus for scarifying pulses as claimed in claim 1, including means for adjusting the chute vertically relative to the axis of the blades.

5. Apparatus for scarifying pulses as claimed in claim 4, including means for adjusting the chute horizontally relative to the axis of the blades.

* * * * *